United States Patent [19]

Inamoto

[11] 4,266,824
[45] May 12, 1981

[54] WEATHERSTRIP RETAINER UNIT FOR AUTOMOBILES AND ROOF CONSTRUCTION WHICH ACCOMMODATES WELL TO INSTALLATION OF ROOF RACK

[75] Inventor: Hiroshi Inamoto, Yokohama, Japan

[73] Assignee: Nissan Motor Company, Limited, Japan

[21] Appl. No.: 22,349

[22] Filed: Mar. 20, 1979

[30] Foreign Application Priority Data

Apr. 6, 1978 [JP] Japan .................. 53/44194[U]

[51] Int. Cl.³ .......................................... B62D 25/06
[52] U.S. Cl. .................................... 296/210; 296/93; 49/490; 49/493; 52/718
[58] Field of Search .................. 296/146, 93, 137 R; 49/490, 489, 493, 499, 494; 52/718

[56] References Cited

U.S. PATENT DOCUMENTS

| 2,687,914 | 8/1954 | Schrum | 49/494 |
| 4,047,751 | 9/1977 | Koike | 296/146 |

FOREIGN PATENT DOCUMENTS

| 725374 | 9/1942 | Fed. Rep. of Germany . |
| 1894563 | 1/1964 | Fed. Rep. of Germany . |
| 1327861 | 4/1963 | France . |
| 1572985 | 5/1969 | France . |
| 2031156 | 11/1970 | France . |
| 2283299 | 3/1976 | France . |
| 1251066 | 10/1971 | United Kingdom . |
| 1474563 | 5/1977 | United Kingdom . |
| 1484962 | 9/1977 | United Kingdom . |

*Primary Examiner*—Robert R. Song
*Attorney, Agent, or Firm*—Lane, Aitken, Ziems, Kice & Kananen

[57] ABSTRACT

A weatherstrip retainer unit and a roof construction using the weatherstrip retainer unit are disclosed. The weatherstrip retainer unit comprises a retainer section and an integral molding section. The roof construction is designed to accommodate well to the installation of a roof rack in which a gutter strip has a flange overlying on the inside surface of a downwardly extending roof edge portion of a roof so as to reinforce the latter. The roof rack is placed with each leg engaging the outside surface of the reinforced roof edge. A plurality of generally U-shaped fasteners are used, each having its longer arm fixedly screwed to the roof rack and its shorter arm engaging the flange of the gutter strip.

14 Claims, 6 Drawing Figures

WEATHERSTRIP RETAINER UNIT FOR AUTOMOBILES AND ROOF CONSTRUCTION WHICH ACCOMMODATES WELL TO INSTALLATION OF ROOF RACK

BACKGROUND OF THE INVENTION

The present invention relates to a weatherstrip retainer unit for automobiles and a roof construction of an automobile, including the weatherstrip retainer, which readily accommodates the installation of a roof rack.

In hard-tops, a weatherstrip retainer is attached to a roof rail at a downwardly facing portion of an outer channel member or outer panel which is secured to an inner wall member or inner panel to form the roof rail. A gutter strip with a rain gutter has a flange secured to the outer channel member and is secured to an outwardly extending roof edge portion. A molding has a flange secured to the retainer and extends upwardly and along the roof edge portion in a manner as to conceal the rain gutter.

This roof construction has the following disadvantages.

One of them is that a seal strip adapted to be disposed between a weatherstrip retainer and the roof rail and a molding to be secured to the retainer must be manufactured independently of the retainer, thus causing an increase, in number, of parts so that arrangement and attachment of the weatherstrip retainer to the roof rail are complicated.

Another of them is that a space g (see FIGS. 2 and 3) provided between the flange of the molding and the rain gutter, which space is provided for allowing tolerance of the rain gutter from the proper location upon securing the flange of the rain gutter to the outer wall member, causes the deformation of the molding if a roof rack is mounted on the roof by a plurality of fasteners, each having arms engaging the rain gutter and the under side of the molding, respectively, tending to urge the molding upwardly toward the rain gutter, as is well shown in FIG. 3.

Still another disadvantage is that the flange of the molding extends horizontally outwardly from the upper surface of the retainer, so that the outer flange of the retainer is not concealed, thus detracting from the external appearance.

SUMMARY OF THE INVENTION

According to the invention, a weatherstrip retainer comprises a member which includes not only a retainer section but also a molding section so that the securing of a physically separate molding member to a retainer member is unnecessary. The molding section merges into or extends outwardly from a lower end of an outer flange of the retainer section so that the outer flange is concealed. The member of the weatherstrip retainer may be formed from a thin sheet metal, by a suitable forming technique such as a roll forming.

A seal strip, which provides a seal between the weatherstrip retainer and the roof rail to which the retainer is attachable, may be fixedly attached to the member of the weatherstrip so that the seal strip is one of the parts forming the weatherstrip retainer unit.

A protector strip may be fixedly attached to the molding section.

These strips and the member of the weatherstrip retainer may be manufactured to form a unit by co-extrusion.

Another aspect of the invention is in a roof construction in an automobile body, comprising the weatherstrip retainer unit, which readily accommodates the installation of a roof rack.

In the roof construction, the outer flange of the retainer section of the member extends substantially downwardly from the outside surface of a roof rail and in parallel to an edge portion of a roof. A gutter strip is secured to the roof rail and has a flange which extends along the roof edge portion to be secured thereto to reinforce the roof edge portion against which each of the legs of a roof rack is pressed when the roof rack is installed by mean of a plurality of fasteners. Each of the fasteners has a generally U-shaped cross-section and it, in use, is fixed at one arm thereof to the roof rack with another arm lying on the flange of the gutter strip secured to the roof edge portion so that the leg of the roof rack and the another arm of each fastener interpose therebetween the roof edge portion and the flange of the gutter strip.

The gutter strip has a side edge portion extending outwardly from that flange which is secured to the roof edge portion. A seal strip is provided between this side edge portion of the gutter strip and the molding section so that the molding section and the gutter strip cooperate to form a rain gutter. This seal is fixedly attached to the member of the weatherstrip retainer. The last-mentioned seal strip and the member of the weatherstrip retainer may be manufactured to form a unit by co-extrusion.

It is therefore an object of the present invention to provide a weatherstrip retainer unit which is easy to install and also to provide a roof construction in an automobile body which facilitates the installation of a roof rack.

BRIEF DESCRIPTION OF THE DRAWINGS

The other features of the invention become apparent as the description proceeds hereinafter in connection with the accompanying drawings.

In the accompanying drawings.

DETAILED DESCRIPTION OF THE DRAWINGS

Figure 1:
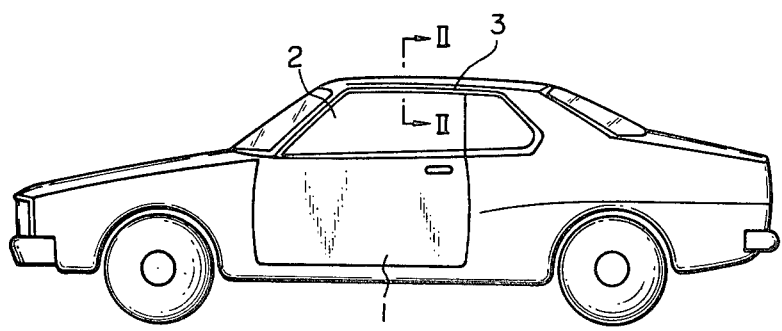
FIG. 1 is a side elevation of an automobile.
Figure 2:
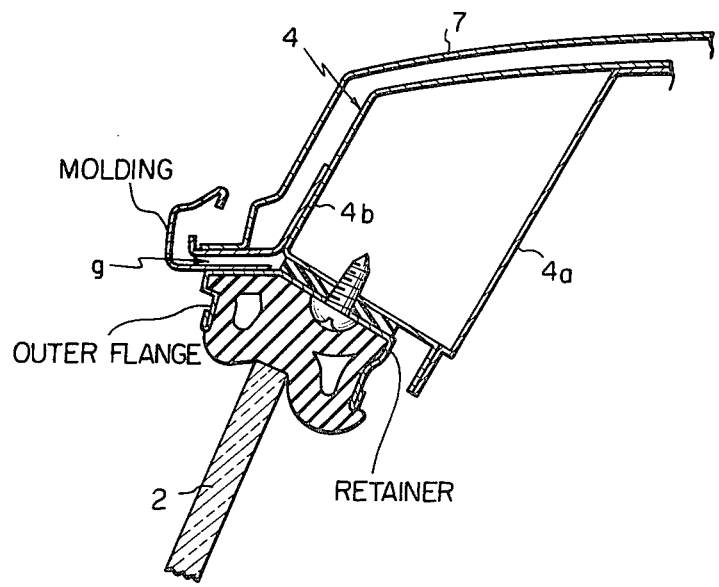
FIG. 2 is a cross section taken along the line II—II in FIG. 1, illustrating the prior art mentioned before.
Figure 3:
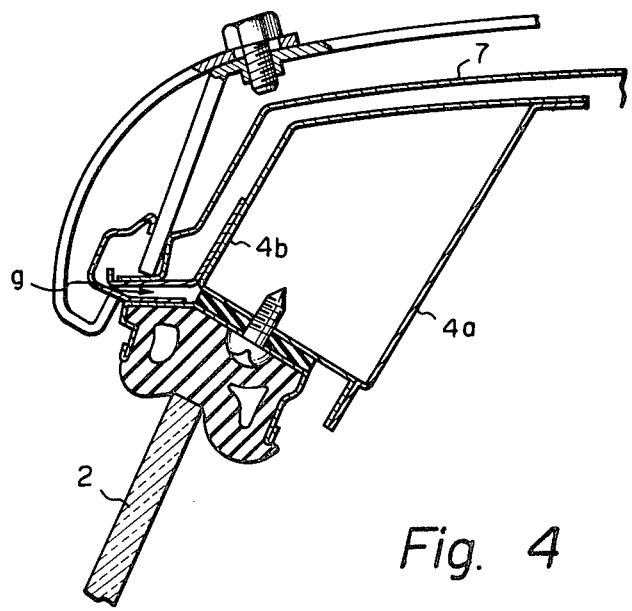
FIG. 3 is a cross section similar to FIG. 2, showing the manner in which a roof rack is installed.

Referring now to the drawings, an automobile has a door 1 provided with a vertically movable window 2 and a weatherstrip 3 (see FIG. 1). The door 1 is of the convertible type without a peripheral frame or rail for the window glass.

Figure 4:
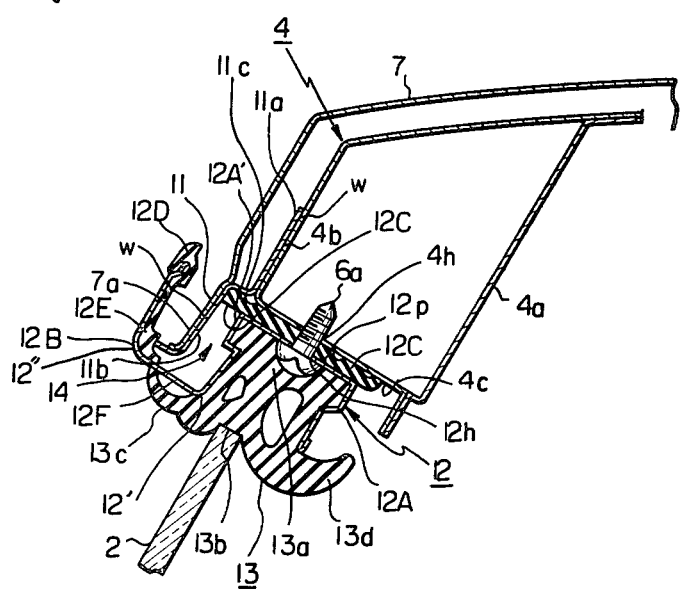
FIG. 4 is a cross section taken along the line II—II in FIG. 1, illustrating the preferred embodiment according to the present invention in which a roof rack is removed.

As shown in FIG. 4, there is a side roof rail, generally designated as 4, which extends along the length of the automobile roof 7. This roof rail is formed as a box, including a channel member 4b having top, outside and bottom walls, the inner side of the roof rail being closed by an inner member 4a which may be welded to the channel member 4b. A gutter strip 11 has a first flange 11a which extends along and is welded, such as a by spot welding at w to the outside surface of the outside wall of the channel member 4b.

The gutter strip 11 is offset outwardly and has a second flange 11b which extends along the inside surface of the edge portion 7a of the roof 7 and is welded thereto such as by spot welding at w. The second flange 11b is connected to the first flange 11a through a shoulder 11c. With the overlap of the second flange 11b on the roof edge portion 7a, the roof edge portion 7a is reinforced.

A weatherstrip retainer unit, generally designated as 12, for a weatherstrip 13 includes a channel like retainer section 12A receiving the base 13a of the weatherstrip 13 and also includes a L-shaped molding section 12B. The molding section 12B merges into the lower end of the outer flange 12A' of the retainer section 12A as 12' and has a horizontal portion extending outwardly from a corner 12' to a corner 12" and a vertical portion extending upwardly from the corner 12". The horizontal portion of the molding section 12B extends under the roof edge 7a and the vertical portion of the molding section 12B extends along the outside surface of the roof edge portion 7a so that the molding section 12B surrounds the roof edge portion 7a and the second flange 11b of the gutter strip 11.

The downwardly facing surface of the shoulder 11c of the gutter strip 11 shares the common plane with the downwardly facing surface 4c of the bottom wall of the channel member 4. The bottom wall is formed with screw holes, only one being shown as 4h, and these screw holes are positioned so that when the weatherstrip retainer unit 12 is attached to the outside surface 4c of the bottom wall of the channel member 4b by screws, only one being shown as 6a, the outer flange 12A' of the retainer section 12A extends downwardly from and along the outside wall of the channel member 4b and in parallel to the second flange 11b of the gutter strip 11 to form a space 14 therebetween.

The weatherstrip retainer unit 12 also includes a seal strip 12C, a protector 12D and a second seal strip 12E. The seal strip 12C is interposed between the outside surface 4c of the bottom wall of the channel member 4 and the adjacent surface 12P of the retainer section 12A and it has a side edge portion 12C' extending toward the second flange 11b of the gutter strip 11. The protector 12D covers the top edge of the vertical portion of the molding section 12B.

The second seal strip 12E is positioned to provide a seal between the vertical portion of the molding section 12B and the side edge portion of the gutter strip 11 extending outwardly from the second flange 11b so that the molding section 12B and the gutter strip 11 cooperate to form a rain gutter.

The seal strip 12C, protector 12D and seal strip 12E are fixedly attached to the retainer section 12A and molding section 12B to form a unit.

The horizontal portion of the molding section 12B closes the bottom end of the space 14 and is formed with a plurality of elongated slots, only one being shown as 12F, thus this horizontal portion may be referred to as a slotted portion.

A stainless thin sheet metal may be formed into a member including the retainer section 12A and the molding section 12B such as by a roll forming. This member and the seal strip 12C, protector 12D and seal strip 12E which are made of a resin, such as a vinyl chloride, or a synthetic rubber, are manufactured to form a unit by co-extrusion.

The weatherstrip 13 is formed with a recessed portion 13b to sealingly engage the top edge portion of the window glass 2. It is also formed with an inside lip 13d extending inwardly from the base portion 13a and with an outside lip 13c extending from the base portion 13a to lie on the outside surface of the horizontal portion of the molding section 12B to conceal the slots 12F.

Installing a roof rack assembly 10 is as follows: Releasing screws, only one being shown as 10c, to separate generally U-shaped fasteners, only one being shown as 10B, from a roof rack 10A.

Figure 5:
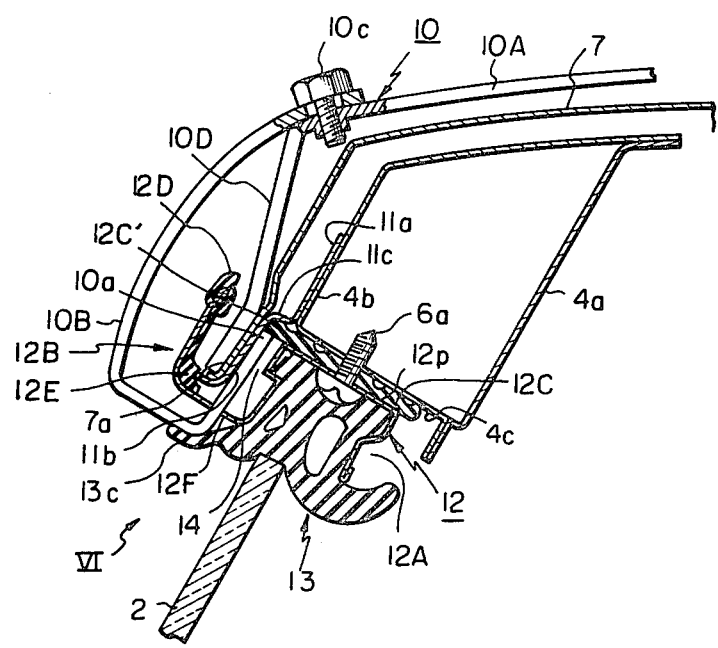
FIG. 5 is a cross section similar to FIG. 4 showing the manner in which a roof rack is installed.
Figure 6:
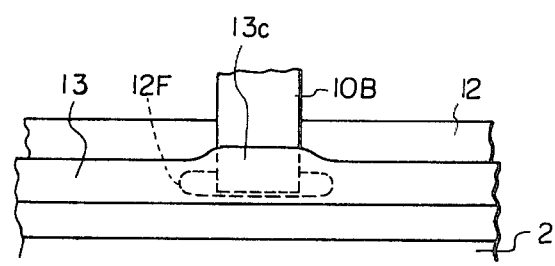
FIG. 6 is a view in the direction of an arrow VI shown in FIG. 5.

Place the roof rack 10A with its downwardly bent legs 10D engaging into rain gutters, respectively. Place each fastener 10B with its shorter arm 10a extending through the slot 12F into the space 14 until the edge of the shorter arm 10a contacts with the edge portion 12C' of the seal strip 12C. Aligning the screw hole formed in the fastener 10B with the mating screw hole formed in the rack 10A. The slot 12F is elongate in the longitudinal direction of the rain gutter to permit limited movement of the fastener 10B for its alignment with the roof rack 10A. Place the screw 10c and tighten it so that each leg 10D of the roof rack 10A and the shorter arm 10a of the fasteners 10B are urged toward each other with the roof edge portion 7a and the second flange 11b therebetween (see FIG. 5). As shown in FIGS. 5 and 6, the lip 13c of the weatherstrip 13 lies on the outside surface of the fastener 10B.

Since the roof edge portion 7a is reinforced with the second flange 11b of the gutter strip 11, it will not deform if the roof rack assembly 10 is installed.

Since the edge of the shorter arm 10a is covered with the side edge portion 12C' of the seal strip 12C and the shorter arm 10a is in plane contact with the second flange 11b of the gutter strip, the metal surface can be protected from damage.

Since, as shown in FIGS. 5 and 6, the slots 12F are concealed by the lip 13c, the external appearance is not degraded.

What is claimed is:

1. In a weatherstrip retainer unit for an automobile body which includes a roof with a roof edge, a roof rail of a box-shape including an inner wall member and an outer channel member having ends secured to the inner wall member, the weatherstrip retainer unit comprising:
 a member including a retainer section attachable to the roof rail and for receiving a weatherstrip,
 said member including a molding section which, when said retainer section is attached to the roof rail, is disposed outwardly, with respect to the automobile body, of the roof and extends along the roof edge;
 a seal strip contactable with the roof rail and fixedly attached to said member;
in which
 said molding section includes a slotted portion extending outwardly from and merging into said retainer section.

2. A weatherstrip retainer unit as claimed in claim 1, in combination therewith of:
 a roof rack;

a plurality of generally U-shaped fasteners, each having one arm fixed to said roof rack and another arm extending through the slotted portion;

said seal strip having a side edge contacting with said another arm of said fastener.

3. A weatherstrip retainer unit as claimed in claim 2, in combination therewith of:

a weatherstrip received by said retainer section and including a lip extending along said slotted portion so as to close slots with which said slotted portion is formed.

4. A roof construction of an automobile comprising:

a roof with a roof edge and a box-shaped roof rail including an inner wall member and an outer channel member having ends secured to said inner wall member;

a retainer unit including a retainer section attached to said roof rail, said retainer unit including a molding section which, after attachment of said retainer unit to said roof rail, extends along said roof edge;

a gutter strip secured to said outer channel member and having a free section secured to said roof edge;

said molding section of said retainer unit including a slotted portion extending outwardly from and merging into said retainer section of said retainer unit;

a roof rack having fingers thereof pressed against said roof edge; and a plurality of U-shaped fasteners, each having one arm fixed to said roof rack and another arm extending through said slotted portion and pressed against said free section of said gutter strip, whereby said roof edge and said free section of said gutter strip are sandwiched between said fingers of said roof rack and said another arms of said U-shaped fasteners.

5. A roof construction as claimed in claim 4, wherein said molding section is formed integrally with said retainer section to form a one-piece unit.

6. A roof construction as claimed in claim 4 or 5, further comprising a seal strip fixedly attached to said retainer section and located in abutment against said free section of said gutter strip.

7. A roof construction as claimed in claim 4 or 5, further comprising a protector strip fixedly attached to said molding section.

8. A roof construction as claimed in claim 6, further comprising a protector strip fixedly attached to said molding section.

9. A roof construction as claimed in claim 4 or claim 5, further comprising a second seal strip fixedly attached to said molding section in sealable contact with a free end of said free section of said gutter strip, said molding section, said second seal strip, and said free section of said gutter strip cooperating with each other to form a rain gutter.

10. A roof construction as claimed in claim 6 further comprising a second seal strip fixedly attached to said molding section in sealable contact with a free end of said free section of said gutter strip, said molding section, said second seal strip and said free section of said gutter strip cooperating with each other to form a rain cutter.

11. A roof construction as claimed in claim 7, further comprising a second seal strip fixedly attached to said molding section of said gutter strip with a free end of said free section of said gutter strip, said molding section, said second seal strip and said free section of said gutter strip cooperating with each other to form a rain cutter.

12. A roof construction as claimed in claim 8, further comprising a second seal strip fixedly attached to said molding section in sealable contact with a free end of said free section of said gutter strip, said molding section, said second seal strip and said free section of said cutter strip cooperating with each other to form a rain cutter.

13. A roof construction as claimed in claim 9, further comprising a weatherstrip received by said retainer section, said weatherstrip including a lip extending along said slotted portion in sealable contact with said slotted portion.

14. A roof construction as claimed in claim 10 or claim 11 or claim 12, further comprising a weatherstrip received by said retainer section, said weatherstrip including a lip extending along said slotted portion in sealable contact with said slotted portion.

* * * * *